Dec. 3, 1957  F. W. CHESSON  2,815,476
SERVOMOTOR CONTROL CIRCUIT
Filed Sept. 25, 1956

United States Patent Office 2,815,476
Patented Dec. 3, 1957

2,815,476

SERVOMOTOR CONTROL CIRCUIT

Fred W. Chesson, Waterbury, Conn., assignor to The Bristol Company, Waterbury, Conn., a corporation of Connecticut Application September 25, 1956, Serial No. 612,013

8 Claims. (Cl. 318—28)

This invention relates to the control of small alternating-current electric motors, and more especially to means for reducing the torque of a motor of this class upon attainment of the limit of excursion of a reciprocatory mechanism driven thereby. In the control of a reversible motor for driving mechanism having limited excursion, it is customary to provide limit switches, usually one mechanically associated with the mechanism at each end of its path and connected into the motor circuit in such a manner as to inhibit further action on the part of the motor once the corresponding end of its travel is attained, but without interfering with the circuit for causing the mechanism to operate freely in the opposite direction. The use of such limit switches is well known in the field of automatic control and is exemplified in U. S. Patents 2,085,855 and 2,085,856, granted July 6, 1937, to O. H. Hunt and to O. H. Hunt et al., respectively.

In some very light control systems, such as self-balancing null-type servo-actuated recording instruments, it is customary to employ a two-phase motor having one winding (the reference winding) continuously energized from an A.-C. source and the other (the control winding) subject to energization from the output of an amplifier, the direction of rotation of said motor being subject to the phase relation between said output voltage and that impressed upon the continuously energized winding. In such cases, there being no distinction among conductors which are active in correspondence to the respective directions of operation, the inclusion of selective limit switches becomes impracticable; and, in such apparatus where the power is low and neither the motor circuits nor the mechanical parts will be adversely affected by sustained conditions of stalling, it is not unusual to omit limit switches or their equivalent and allow the motor circuits to remain energized upon attainment of either extremity of the scale, and the pen-carriage or equivalent movable member to remain forced against a stop by the full power of the motor so long as the circuits of the latter are in a condition to move the carriage beyond either extremity of its normal range. This practice is not uncommon in those self-balancing instruments whose application is such that, in normal operation, the moving member seldom reaches either end of its range of travel and where there is even less likelihood of said member being maintained at the end of the scale for extended periods of time. In some ranges of instruments, however, such as those having greatly expanded scales or those with suppressed zeros, it is quite usual for the pen-carriage or equivalent moving member to reach the upper, or lower, limit of its possible excursion and to be retained there for indefinite periods with power on the motor. It is in such applications that the present invention finds its maximum utility.

It is a common feature of electronic amplifiers of the class used for motor control in self-balancing systems that the motor-control field current supplied by the output tube is composed effectively of a unidirectional component on which an alternating component is superimposed. This alternating component depends in intensity and phase upon the corresponding values of the potential impressed on the control electrode of the amplifier output tube. The composite of alternating and direct currents flows in the output circuit as a whole, but either component may be substantially eliminated from any selected part of the circuit by suitable filtering means. Where the output current of a thermionic amplifier is utilized in the operation of an A.-C. motor, it may or may not be found desirable to eliminate the D.-C. component and prevent it flowing in the motor winding. An example of the former practice is found in U. S. Letters Patent No. 1,973,279, issued to H. L. Bernarde September 11, 1934, and wherein the output of an electronic amplifier utilized for the control of a small two-phase motor is passed through a filter network whereby the D.-C. component is eliminated and only the alternating component impressed upon the motor winding.

In certain forms of control in the class under discussion, it has been found that a unidirectional component in the motor-winding current may have a degree of utility. This is recognized in U. S. Letters Patent No. 2,423,540, issued to W. P. Wills July 8, 1947. In said Wills patent, the effect of the unidirectional component is utilized to provide a braking action, damping the operation of the motor and tending to bring it abruptly to rest when the alternating or driving component disappears. The principle whereby this effect is produced is well understood and, forming no part of the present invention, need not here be further discussed.

In installations of the hereinbefore-mentioned class wherein it is inexpedient to include conventional limit switches, the movable member driven by the motor will travel to the limit of its excursion and, if the driving current be not eliminated, will remain forced against the corresponding stop. With alternating current only in the motor windings, the pressure is easily resisted, and, with suitable design, neither the motor nor the mechanism will be harmed by indefinite continuance of this condition. If, however, there be a unidirectional component in one of the windings, as is the case where such current is utilized for braking purposes, the tendency when the motor is stalled is for severe vibration to develop, whether or not that winding is at the same time carrying an A.-C. component. Such vibration can become injurious to mechanical parts and, where gears are involved, may result in serious and destructive wear.

It is, therefore, an object of the present invention to provide means whereby the objectionable and deleterious effect of the unidirectional component of the current in the control winding of an alternating-current motor may be minimized or eliminated upon the moving element controlled by the motor attaining one, or either, extremity of its normal excursion.

A further object is to provide simultaneously a material reduction in the force of engagement of the moving element with the stop.

In accordance with the present invention, the unidirectional component of the current in the control winding may be minimized or eliminated upon the moving element reaching either extremity of its normal excursion. At the same time, the alternating-current component of said current may be substantially reduced, so that, while retaining a sufficient proportion of the same to operate the motor when control conditions dictate that the moving element should be moved away from the stop, the force of engagement with the stop will be materially reduced. In one preferred arrangement for carrying out the invention, there is provided, in combination with a reversible servomotor of the two-phase class shunted by a capacity, a circuit including a rectifying element adapted to be rendered more or less effective by means of a series resistance and to be inserted in the control network by limit-switch means mechanically operated by the deflectable member as the latter approaches one or other extremity of its normal excursion.

Further objects as well as advantages of the present invention will be apparent from the following description and the accompanying drawings in which.

Figure 1:
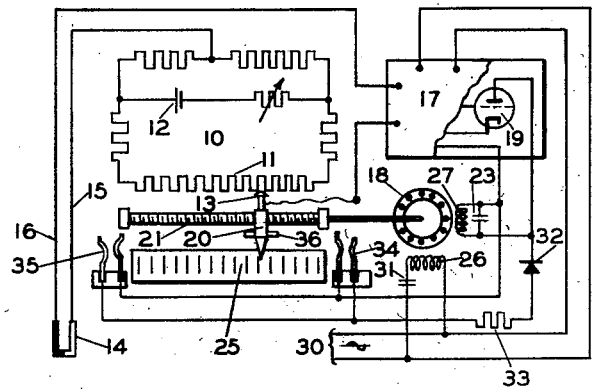
Figure 1 is a diagram of a self-balancing null-type measuring instrument incorporating the principles of the invention.

Referring now to the drawings, especially Figure 1, potentiometer network 10 includes a slide-wire 11 adapted for energization from a constant-potential battery or equivalent source 12, and having a movable contact 13 adapted to cooperate with said slide-wire in establishing balance of the potentiometer network. A source of electromotive force whose magnitude is to be measured is represented by a thermocouple 14 having extension leads 15 and 16 connected between the contact 13 and a further selected point in the potentiometer network in series with a detector-amplifier 17. Said detector-amplifier includes means for deriving from the unbalance potential of the potentiometer network 10 a representative alternating potential which may be amplified and applied in the control of a conventional servomotor 18 for rebalancing the network. The final, or "power," stage of said amplifier is represented in a triode 19 having a cathode, a control electrode, and an anode whose output current is utilized in operation of the motor 18.

The contact member 13 is insulatedly borne upon a carriage 20 adapted to be translated from end to end of the slide-wire 11 by means of a lead-screw 21 adapted to be rotated in either direction by the reversible motor 18. Display of the position of the contact member 13 corresponding to a condition of balance in the network 10 may be in the nature of either an indication or a graphic record and herein, for purposes of simplicity, is effected by means of an index or pointer attached to the carriage 20 and adapted to provide an indication upon a juxtaposed graduated scale 25. The reversible motor 18 is of the two-phase alternating-current class, having two mutually displaced windings 26 and 27, of which the former is continuously energized from a suitable A.-C. source 30. In circuit with the winding 26 may be placed a capacitor 31 or other phase-shifting device to secure optimum operating performance as is well known in the art of control of such motors. The winding 27 is connected to the output terminals of the amplifier 17, whereby to be energized by a current having an alternating component depending in phase and in intensity upon the sense and the magnitude, respectively, of unbalance in the network 10.

As thus far described, with the amplifier 17 connected to receive its power supply from the same source 30 as energizes the winding 26 of the motor 18, there is obtained reversible operation of the motor in a direction depending upon the polarity of the unbalance potential and in a sense to reduce that potential to a zero magnitude.

As previously pointed out, the plate current of the triode 19, which is the output of the amplifier, contains a D.-C. component, always of the same polarity, upon which is superimposed an alternating component of phase depending upon the senses of unbalance; and, while the latter component provides for reversible operation of the motor, the former provides a braking or retarding influence useful in preventing overshooting and in obtaining critical performance as a balance condition is approached.

While the unidirectional component of current in the winding 27 of the motor provides dynamic braking so long as the rotor is in motion, it produces a magnetic field which, reacting with the alternating field produced by the winding 26, tends to set up an oscillatory motion, resulting in objectionable vibration if the rotor is held against rotation.

Connected across the terminals of the motor winding 27 is a capacitor 23 and a series arrangement consisting of a diode rectifier 32, a resistor 33, and a pair of parallel-connected normally open spring contactors 34 and 35. Said spring contactors are positioned in proximity to the respective ends of the path of the carriage 20, which carries a tappet member 36 adapted to engage one or other of said contactors, according to the extremity of excursion approached by the carriage and to force the engaged contactor into its closed condition.

When desired, phase-shifting capacitor 31 may be omitted and its function incorporated in capacitor 23, in which case the latter in conjunction with the amplifier accomplishes the shift in phase necessary to operate motor 18.

To illustrate the action of this circuit, the distribution of current flow in the several components of the output of the amplifier is shown in accompanying graphs, first under normal conditions (in Figure 2) as the motor responds to a sudden unbalance signal, and then (in Figure 3) the corresponding situation when the shunted rectifier 32 and associated resistance 33 is cut into circuit by either of the limit switches 34 or 35.

Figure 2:
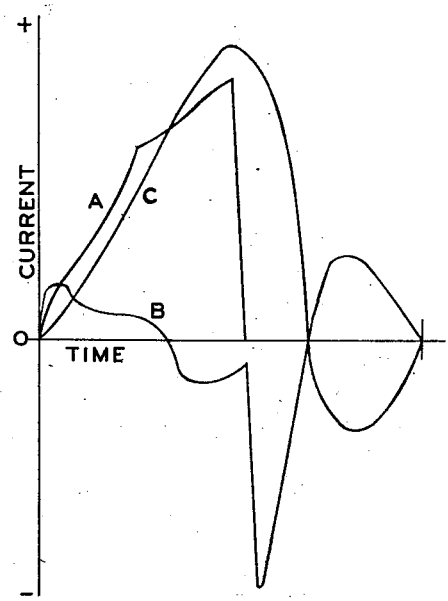
Figures 2 and 3 are graphic representations of certain current relationships encountered in operation of the device.

Referring to Figure 2 illustrating normal operation, curve A shows the plate current under dynamic conditions during any one cycle, curve B is the current at the capacitor 23, and curve C is the current through the balancing motor winding 27 during the same period. From these curves, it may be seen that, as the voltage on the control grid of the output tube drives the tube into a state of heavy conduction, current flows to capacitor 23 and begins to charge it, limited by the plate resistance of the tube. Meanwhile, the rise of the plate current is limited by the impedance of the motor field. The motor-field current proceeds to rise at an essentially constant rate, and the charging current to the capacitor falls to zero. At this point, the rising motor-field current has equalled in magnitude the plate current, the tube becomes saturated, and the field current then exceeds the plate current. This excess current is furnished by the capacitor, whose discharge current reaches a maximum and then decreases as the field-current rate, having reached a maximum, itself diminishes. At this time, the grid signal causes the tube to cut off from the conductive state, and the plate current immediately drops to zero. The current in the motor field tends, however, to maintain its direction and causes a sudden flow into the capacitor. This current reaches its peak and then decreases, finally reaching zero simultaneously with the motor-field current. Since the motor-field current tends to retain its rate of change, the capacitor current now reverses direction and reaches a second peak in coincidence with that of the motor field. This damped oscillatory discharge again approaches zero but is interrupted by the return of the tube to a conducting state under the influence of the alternating voltage on the grid.

The resultant field-current curve is characteristic of an alternating current superimposed on a unidirectional current, and it might be shown that, as balance is approached, the alternating-current component becomes progressively weaker, approaching the unidirectional current value as balance is attained.

Figure 3:
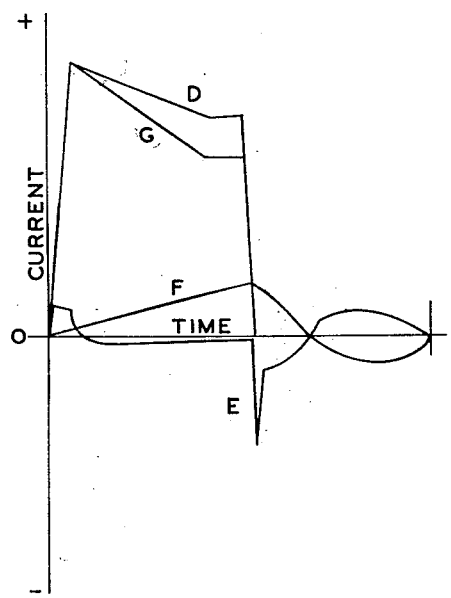

The desensitizing effect of the shunted circuit elements may be better understood by a graphic representation of the current components in the output circuit as shown in Figure 3. Here, it is assumed that one of the limit switches is closed, whence the motor control field is shunted by a series combination of resistance and a diode rectifier whose cathode is connected to the anode end of the motor winding; also that the system is subjected to a sudden unbalance of similar magnitude as in the preceding case, but in a direction tending to drive the balancing mechanism against one of the limit switches. In this case, curve D designates the current in the plate circuit of the tube 19; curve E, the current through the capacitor 23; curve F, the current through the control winding of the motor; and curve G, the current through the diode rectifier 32, all for one cycle of the control grid voltage. The action is thereby indicated to take place in the following manner: With a limit switch closed, the inductance of the control field is shunted by the now-conducting rectifier and its associated resistor to an extent that the rising plate current may closely follow the grid signal; the capacitor current rises initially in a similar manner to the point at which the increasing control-field current causes it to begin to decrease. Due to the shunt, the control-field current rises to only a fraction of its normal value. When the tube cuts off on reversal of the grid voltage, the rectifier no longer conducts, and, effectively, the shunt is opened. Thus, at a greatly reduced amplitude, the damped oscillatory wave of the normal operation is repeated as in Figure 2. The control-field current is thus shown to be of an alternating character with a greatly reduced unidirectional component. Actually, when either limit switch is closed, the smaller the departure from a condition of balance the less the alternating-current component of field current. A minimum value of this component is established by suitable choice of resistance 33 and capacitance 23, by which it may provide a minimum torque in the motor always sufficient to move the stalled balancing mechanism in a reverse direction away from the limit switch when conditions require it to seek a balance point within the operating range of the instrument. Likewise, the value of the unidirectional current component, though small, varies with the unbalance potential and is actually held to a maximum value determined by the resistances of the control winding of the motor and of the shunt circuit, a value which is incapable of producing the harmful effects hereinbefore described.

Figure 4:
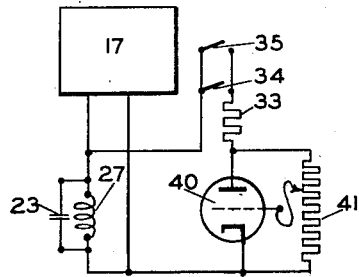
Figure 4 is diagrammatic view of a further embodiment of the invention.

A high degree of flexibility in adjustment of the desensitizing shunt may be obtained by the arrangement shown in Figure 4, wherein the diode rectifier 32 shown in Figure 1 is replaced by a grid-controlled rectifier in the form of a triode 40 with its cathode connected to power tube 19 and its anode to the resistor 33. Shunted between the anode and cathode of the triode 40 is an adjustable voltage divider 41 having a movable contact connected to the control electrode of said triode. By adjustment of said movable contact, the potential of the grid may be set at any value between those of the anode and the cathode, respectively, whereby the rectifying property of the triode may be correspondingly adjusted. Resistance 33 is no longer essential and may be omitted, since its effect may be taken account of in the adjustment of the voltage divider 41. The explanation of the operation of the circuit does not differ essentially from that of the circuit of Figure 1.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In a control system for a reversible motor having a limited travel in either direction, means for causing to flow through a winding of said motor a current having an alternating component for driving the motor and a unidirectional component for braking the same, switching means adapted to be operated at the limits of motion of said motor, and circuit means adapted upon operation of any of said switching means to suppress said unidirectional component and limit the amplitude of said alternating component.

2. In a control system for a reversible motor having a limited travel in either direction, means for causing to flow through a winding of said motor a current having an alternating component for driving the motor and a unidirectional component for braking the same, capacity shunted across said winding, a rectifying shunt, and means adapted upon said motor reaching an end of its travel to connect said rectifying shunt across the terminals of said winding and said capacity.

3. In a control system for a reversible motor having a limited travel in either direction, means for causing to flow through a winding of said motor a current having an alternating component for driving the motor and a unidirectional component for braking the same, a capacitor in shunt with said winding, movable means responsive to said motor and adapted to be displaced thereby between two extreme positions, switching means adjacent to each of said extreme positions and adapted to be operated by said movable means upon arrival of the latter at either of said positions, and a series connected diode rectifier and resistor adapted to be connected in shunt with said winding and capacitor upon arrival of said movable means at either of said extreme positions and operation of said switching means for bypassing said unidirectional component and limiting the amplitude of said alternating component with respect to said winding.

4. In a control system for a reversible motor having a limited travel in either direction, means for causing to flow through a winding of said motor a current having an alternating component for driving the motor and a unidirectional component for braking the same, a capacitor in shunt with said winding, movable means responsive to said motor and adapted to be displaced thereby between two extreme positions, switching means adjacent to each of said extreme positions and adapted to be operated by said movable means upon arrival of the latter at either of said positions, an electron tube having cathode, anode and control electrodes, a variable resistor connected between said cathode and anode electrodes and having an adjustable tap connected to said control electrode, said electron tube being adapted to be connected in shunt with said winding and capacitor upon arrival of said movable means at either of said extreme positions and operation of said switching means for bypassing said unidirectional component and limiting the amplitude of said alternating component with respect to said winding.

5. In a servo system including a balanceable electrical network adapted to produce an output current having an alternating component representative in intensity and phase position of the degree and sense respectively of unbalance and a unidirectional component, a servomotor having a winding connected to be driven by said alternating current component and to be braked by said unidirectional component, a capacitor in shunt with said winding, mechanically movable means responsive to said servomotor and adapted to be displaced between two extreme positions and incidentally effect a balance of said network, switching means adjacent to each of said extreme positions and adapted to be operated by said mechanically movable means upon arrival of the latter at either of said positions, and circuit means adapted to be connected in shunt with said winding and capacitor upon arrival of said mechanically movable means at either of said extreme positions and operation of said switching means for bypassing said unidirectional component and limiting the amplitude of said alternating component with respect to said winding.

6. In a servo system including a balanceable electrical network adapted to produce an output current having an alternating component representative in intensity and phase position of the degree and sense respectively of unbalance and a unidirectional component, a servomotor having a winding connected to be driven by said alternating current component and to be braked by said unidirectional component, a capacitor in shunt with said winding, mechanically movable means responsive to said servomotor and adapted to be displaced between two extreme positions and incidentally effect a balance of said network, switching means adjacent to each of said extreme positions and adapted to be operated by said mechanically movable means upon arrival of the latter at either of said positions, and circuit means including a diode rectifier adapted to be connected in shunt with said winding and capacitor upon arrival of said mechanically movable means at either of said extreme positions and operation of said switching means for bypassing said unidirectional component and limiting the amplitude of said alternating component with respect to said winding.

7. In a servo system including a balanceable electrical network adapted to produce an output current having an alternating component representative in intensity and phase position of the degree and sense respectively of unbalance and a unidirectional component, a servomotor having a winding connected to be driven by said alternating current component and to be braked by said unidirectional component, a capacitor in shunt with said winding, mechanically movable means responsive to said servomotor and adapted to be displaced between two extreme positions and incidentally effect a balance of said network, switching means adjacent to each of said extreme positions and adapted to be operated by said mechanically movable means upon arrival of the latter at either of said positions, and circuit means including an electron device having a control electrode connected to an intermediate point along a resistor connected between input and output electrodes of said electron device, said circuit means being adapted to be connected in shunt with said winding and capacitor upon arrival of said mechanically movable means at either of said extreme positions and operation of said switching means for bypassing said unidirectional component and limiting the amplitude of said alternating component with respect to said winding.

8. In a servo system including a balanceable electrical network adapted to produce an output current having an alternating component representative in intensity and phase position of the degree and sense respectively of unbalance and a unidirectional component, a servomotor having a winding connected to be driven by said alternating current component and to be braked by said unidirectional component, a capacitor in shunt with said winding, mechanically movable means responsive to said servomotor and adapted to be displaced between two extreme positions and incidentally effect a balance of said network, switching means adjacent to each of said extreme positions and adapted to be operated by said mechanically movable means upon arrival of the latter at either of said positions, and circuit means including an electron tube having cathode, anode and control electrodes, a resistor connected at an intermediate point thereof to said control electrode and at opposite ends thereof to said cathode and anode electrodes, said circuit means being adapted to be connected in shunt with said winding and capacitor upon arrival of said mechanically movable means at either of said extreme positions and operation of said switching means for bypassing said unidirectional component and limiting the amplitude of said alternating component with respect to said winding.

No references cited.